(12) United States Patent
Chi et al.

(10) Patent No.: US 11,984,622 B1
(45) Date of Patent: May 14, 2024

(54) BATTERY CELL, METHOD AND APPARATUS OF MANUFACTURING THE SAME, BATTERY, AND ELECTRIC APPARATUS

(71) Applicant: CONTEMPORARY AMPEREX TECHNOLOGY CO., LIMITED, Ningde (CN)

(72) Inventors: Qingkui Chi, Ningde (CN); Tao Pu, Ningde (CN); Yang Zou, Ningde (CN); Wenjie Yu, Ningde (CN); Zhisheng Chai, Ningde (CN); Haizu Jin, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/412,333

(22) Filed: Jan. 12, 2024

Related U.S. Application Data

(63) Continuation of application No. PCT/CN2022/072426, filed on Jan. 17, 2022.

(51) Int. Cl.
  *H01M 50/536* (2021.01)
  *H01M 10/04* (2006.01)
  (Continued)

(52) U.S. Cl.
  CPC ..... *H01M 50/536* (2021.01); *H01M 10/0404* (2013.01); *H01M 10/0431* (2013.01);
  (Continued)

(58) Field of Classification Search
  CPC ............. H01M 50/536; H01M 50/107; H01M 50/474; H01M 50/152; H01M 50/545;
  (Continued)

(56) References Cited

U.S. PATENT DOCUMENTS

2012/0070721 A1   3/2012   Han et al.

FOREIGN PATENT DOCUMENTS

CN    203553278 U   *   4/2014
CN    203553278 U       4/2014
(Continued)

OTHER PUBLICATIONS

International Search Report for International Application No. PCT/CN2022/072426, dated Oct. 10, 2022.
(Continued)

*Primary Examiner* — Basia A Ridley
*Assistant Examiner* — Heng M. Chan
(74) *Attorney, Agent, or Firm* — Ladas & Parry LLP

(57) ABSTRACT

A battery cell includes a shell, an end cover, an electrode assembly, and a current collector component. The shell has an opening, and the inner surface of the shell is provided with a first limit part in a protruding manner. The end cover covers the opening. The electrode assembly and the end cover are respectively located on both sides of the first limit part, and the electrode assembly has a tab on the side facing the end cover. The current collector component includes a body part and a connecting part, and the connecting part is connected to the first limit part. The body part includes a first welding region and a second welding region, the first welding region is located on the periphery of the second welding region, the first welding region and the second welding region are separated by the connection position between the connecting part and the body part.

20 Claims, 11 Drawing Sheets

(51) Int. Cl.
*H01M 50/107* (2021.01)
*H01M 50/152* (2021.01)
*H01M 50/186* (2021.01)
*H01M 50/213* (2021.01)
*H01M 50/474* (2021.01)

(52) U.S. Cl.
CPC ....... *H01M 10/049* (2013.01); *H01M 50/107* (2021.01); *H01M 50/152* (2021.01); *H01M 50/186* (2021.01); *H01M 50/213* (2021.01); *H01M 50/474* (2021.01)

(58) Field of Classification Search
CPC ........... H01M 50/528; H01M 10/0404; H01M 10/0431; H01M 10/049
See application file for complete search history.

(56) References Cited

FOREIGN PATENT DOCUMENTS

| | | |
|---|---|---|
| CN | 112820948 A | 5/2021 |
| CN | 113258124 A | 8/2021 |

OTHER PUBLICATIONS

Written Opinion of International Searching Authority for International Application No. PCT/CN2022/072426, dated Oct. 10, 2022.
Notice of Grant of Utility Model Patent Rights for CN Application No. 202220118585.7, dated Jun. 6, 2022.

\* cited by examiner

BATTERY CELL, METHOD AND APPARATUS OF MANUFACTURING THE SAME, BATTERY, AND ELECTRIC APPARATUS

CROSS-REFERENCE TO RELATED APPLICATION

This application is a continuation of International Patent Application No. PCT/CN2022/072426, filed on Jan. 17, 2022, the subject matter of which is incorporated by reference herein in its entirety.

TECHNICAL FIELD

The present application relates to the field of battery technology, specifically to a battery cell and a manufacturing method and a manufacturing equipment thereof, as well as a battery and an electrical device.

BACKGROUND

Lithium ion batteries have outstanding advantages such as high energy density, low environmental pollution, high power density, long service life, wide adaptability, and low self discharge coefficient, which are one of the most widely used batteries in the world today and an important component of the development of new energy. The battery cell of the lithium ion battery is obtained by assembling a positive electrode plate, a negative electrode plate, and a separator to an electrode assembly (bare cell) by means of winding or stacking, then putting the electrode assembly into a shell, covering an end cover, and finally injecting the electrolyte. However, with the continuous development of lithium ion battery technology, higher requirements have been put forward for the quality and use safety of lithium ion batteries. However, batteries in existing technologies present significant safety hazards during later use, which are detrimental to the safety of consumers' use.

SUMMARY

The embodiment of the present application provides a battery cell, a manufacturing method and a manufacturing equipment thereof, a battery, and an electrical device, which can effectively reduce the safety hazards of the battery during use.

In the first aspect, the embodiment of the present application provides a battery cell, including a shell, an end cover, an electrode assembly, and a current collector component, wherein the shell has an opening, and the inner surface of the shell is provided with a first limit part in a protruding manner; the end cover covers the opening; the electrode assembly is accommodated within the shell, and is located on the side of the first limit part away from the end cover, the side of the electrode assembly facing the end cover has a tab, and the first limit part is configured to limit the movement of the end cover in the direction facing the electrode assembly; and the current collector component is accommodated within the shell, and the current collector component includes a body part and a connecting part connected to the body part, the body part is configured to connect the tab, and the connecting part is configured to connect the first limit part, wherein the body part includes a first welding region and a second welding region, the first welding region is located on the periphery of the second welding region, the first welding region and the second welding region are separated by the connection position between the connecting part and the body part, and both the first welding region and the second welding region are welded to the tab.

In the above technical solution, the inner surface of the shell is provided with a first limit part in a protruding manner. The electrode assembly and end cover are respectively arranged on both sides of the first limit part, and the connecting part of the current collector component is connected to the first limit part, so as to achieve electrical connection between the electrode assembly and the shell through the current collector component. The battery cell with this structure, on one hand, can effectively improve the connection reliability between the current collector component and the shell, which is beneficial for improving the electrical connection effect between the electrode assembly and the shell, and on the other hand, the built-in connection position between the current collector component and the shell can be achieved. That is to say, through this structure, the connection position between the current collector component and the shell can be located on one side of the end cover, thereby reducing the impact on the sealing between the end cover of the shell and the shell, so as to ensure the sealing effect between the end cover and the shell. In addition, by welding the first welding region and the second welding region formed by separating the body part through the connecting part onto the tab of the electrode assembly, the connection relationship between the outer ring of the tab and the current collector component can be effectively ensured, thereby reducing the occurrence of local overcurrent between the outer ring of the tab and the current collector component, and effectively reducing the risk of polarization and lithium precipitation of the battery cell during the later cyclic charging and discharging process, so as to reduce the safety hazards of battery cell during later use, which is beneficial to ensuring the safety of consumers' use.

In some embodiments, along the radial direction of the current collector component, the distance from the connection position between the connecting part and the body part to the outer edge of the body part is not less than 2 mm.

In the above technical solution, by setting the distance from the connection position of the connecting part and the body part to the outer edge of the body part to be greater than or equal to 2 mm, it is possible to ensure that the first welding region located on the outer periphery of the second welding region has sufficient space to be welded with the tab, so as to meet the weldable region of the first welding region, which is conducive to improving the problem of the outer ring of the tab being unable to weld with the current collector component, so as to achieve the connection between the outer ring of the tab and the current collector component.

In some embodiments, the connecting part includes an extension section and a connection section, wherein the extension section is connected to the body part, and extends from the body part in a direction away from the electrode assembly, and the extension section is at least partially located on the inner periphery of the first limit part; and the connection section is connected to the extension section, and at least part of the connection section abuts against the side of the first limit part that is away from the electrode assembly and is connected to the first limit part.

In the above technical solution, the connecting part is provided with an extension section and a connection section. By setting the extension section on the inner periphery of the first limit part and connecting the connection section to one end of the extension section, the connection section can abut against the side of the first limit part away from the electrode assembly and be connected to the first limit part, thereby ensuring the connection strength and stability between the current collector component and the first limit part of the shell, which is beneficial to improving the electrical connection effect between the current collector component and the shell, and to enhancing the service life of the battery cell.

In some embodiments, along the extension direction of the extension section, the thickness of the extension section gradually decreases from one end connected to the body part to one end connected to the connection section.

In the above technical solution, by setting the thickness of the extension section to gradually decrease from one end connected to the body part to the other end connected to the connection section, that is to say, when the thickness of the extension section becomes smaller as it approaches the connection section, the current collector component with this structure makes it easier for the extension section to bend along the radial direction of the current collector component towards the direction near the first limit part, such that the connection section can abut against the side of the first limit part away from the electrode assembly and be connected with the first limit part, in which the structure is simple and easy to implement and process.

In some embodiments, the extension section extends along an arc trajectory from one end connected to the body part to one end connected to the connection section, with the center of the arc trajectory located on the outer circumference of the extension section.

In the above technical solution, by setting the extension section as a structure that extends in an arc trajectory from one end connected to the body part to the other end connected to the connection section, that is to say, when the extension section is bent into an arc structure along the radial direction of the current collector component towards the direction near the first limit part, the extension section with this structure is not only convenient for processing and manufacturing, but also can reduce the risk of fracture of the extension section during the bending process.

In some embodiments, the connection position between the connection section and the extension section forms a notching groove for the connection section to bend relative to the extension section.

In the above technical solution, a notching groove is formed at the connection position between the connection section and the extension section, which means that a weakened region is formed between the connection section and the extension section, thereby making it easier for the connection section to bend toward the direction near the first limit part along the radial direction of the current collector component relative to the extension section, such that the connection section can abut against the side of the first limit part away from the electrode assembly and be connected with the first limit part, in which the structure is simple and easy to implement.

In some embodiments, the extension direction of the extension section is consistent with the thickness direction of the body part.

In the above technical solution, the extension direction of the extension section is set to be consistent with the thickness direction of the body part, so as to facilitate the processing of notching groove at the connection position between the extension section and the connection section, thereby reducing the manufacturing difficulty of the current collector component.

In some embodiments, the first limit part and the connecting part are both in a circular structure arranged along the circumferential direction of the current collector component.

In the above technical solution, the first limit part and the connecting part are both set to be in a circular structure extending along the circumferential direction of the current collector component, which is beneficial for improving the structural strength of the first limit part and the connecting part, thereby effectively improving the service life of the battery cell.

In some embodiments, the connection section is provided with multiple notches, wherein the multiple notches are arranged at intervals along the circumferential direction of the current collector component; and along the circumference direction of the current collector component, the connection section forms a bending region between each two adjacent notches, wherein the bending region can bend toward the outer circumference of the extension section relative to the extension section.

In the above technical solution, the connection section is provided with multiple notches, and the multiple notches are arranged at intervals along the circumferential direction of the connection section, such that a bending region can be formed between each adjacent two notches for connecting to the first limit part. The connection section with this structure, on the one hand, can be connected to the side of the first limit part away from the electrode assembly after the connection section is bent relative to the extension section, and on the other hand, can effectively alleviate the phenomenon of wrinkles in the connection section after bending relative to the extension section.

In some embodiments, the connection section is welded with the first limit part to form a weld mark, and the length of the weld mark is not less than half of the perimeter of the first limit part along the circumferential direction of the current collector component.

In the above technical solution, by setting the length of the weld mark formed by welding the connection section and the first limit part on the circumferential direction of the current collector component to be greater than or equal to half of the perimeter of the first limit part, that is to say, when the welding length between the connection section and the first limit part is not less than half of the perimeter of the first limit part, on one hand, it is beneficial for improving the stability and reliability of the connection between the connection section and the first limit part, so as to improve the service life and use reliability of the battery cell, and on the other hand, it can ensure the current guiding area between the connection section and the first limit part, so as to reduce the risk of temperature rise inside the battery cell caused by excessive current between the connection section and the first limit part.

In some embodiments, an abutting plane for the connection section to abut is formed at a side of the first limit part away from the electrode assembly.

In the above technical solution, by setting the side of the first limit part that is away from the electrode assembly as an abutting plane, that is to say, when the side of the first limit part for the connection section to abut and connect is provided as a flat structure, the first limit part with this structure is convenient for the connection section to abut and connect, and is conducive to increasing the connection area and contact area between the connection section and the first limit part, so as to improve the connection stability and current guiding stability between the connection section and the first limit part.

In some embodiments, the battery cell further includes a limit member, wherein the limit member is accommodated within the shell, and is at least partially located between the inner surface of the shell and the outer surface of the body part, so as to limit the movement of the body part along the radial direction of the current collector component.

In the above technical solution, a limit member is set between the inner surface of the shell and the outer surface of the body part to limit the current collector component to a certain extent through the limit member, thereby limiting the radial movement of the current collector component relative to the shell, so as to reduce the risk of falling off of the connecting part and the first limit part due to the movement of the current collector component relative to the shell, thereby ensuring the use stability and reliability of the battery cell, and effectively improving the service life of battery cell.

In some embodiments, the limit member is in an interference fit with the body part.

In the above technical solution, by setting an interference fit between the body part and the limit member, on one hand, this structure can effectively increase the connection firmness between the body part and the limit member, thereby better limiting the radial movement of the current collector component relative to the shell, and on the other hand, it can also play a certain limiting role in the axial movement of the current collector component relative to the shell.

In some embodiments, the limit member is at least partially located between the inner surface of the shell and the outer surface of the tab, and the limit member has a positioning surface that fits with the outer surface of the tab.

In the above technical solution, the limit member is equipped with a positioning surface that matches the outer circumference surface of the tab to achieve positioning coordination between the limit member and the tab, such that the limit member can position the current collector component on the tab to reduce the phenomenon of radial movement of the current collector component relative to the tab, which is conducive to reducing the risk of detachment between the current collector component and the tab, and ensuring the use reliability of the battery cell.

In some embodiments, the battery cell further includes a sealing member, wherein the sealing member is located on the side of the first limit part away from the electrode assembly, and is configured to seal the end cover and the shell.

In the above technical solution, the battery cell is also equipped with a sealing member for sealing the gap between the end cover and the shell, and the sealing member is arranged on the side of the first limit part away from the electrode assembly, so as to achieve the connection position between the current collector component and the shell to be located on one side of the end cover, which is beneficial for reducing the interference caused by the connection position between the current collector component and the shell on the sealing between the end cover and the shell, thereby ensuring the sealing effect between the end cover and the shell.

In some embodiments, a roller groove is provided at a position of the outer surface of the shell corresponding to the first limit part.

In the above technical solution, by setting a roller groove on the outer surface of the shell, the shell can form a first limit part at the position corresponding to the roller groove during the formation of the roller groove, which simplifies the forming process of the first limit part and facilitates the manufacturing and processing for the first limit part.

In the second aspect, the embodiment of the present application also provides a battery, including multiple aforementioned battery cells.

In the third aspect, the embodiment of the present application also provides an electrical device, including the aforementioned battery.

In the fourth aspect, the embodiment of the present application also provides a manufacturing method for battery cell, including:
providing a shell, wherein the shell has an opening, and the inner surface of the shell is provided with a first limit part in a protruding manner;
providing an end cover;
providing an electrode assembly, wherein one side of the electrode assembly has a tab;
providing a current collector component, wherein the current collector component includes a body part and a connecting part connected to the body part;
connecting the body part to the tab;
accommodating the electrode assembly and the current collector component within the shell, and positioning the electrode assembly on one side of the first limit part;
connecting the connecting part to the first limit part; and
covering the end cover to the opening and positioning the end cover on the side of the first limit part away from the electrode assembly, wherein
the body part includes a first welding region and a second welding region, the first welding region is located on the periphery of the second welding region, the first welding region and the second welding region are separated by the connection position between the connecting part and the body part, and both the first welding region and the second welding region are welded to the tab.

In the fifth aspect, the embodiment of the present application also provides a manufacturing equipment for battery cell, including a first providing device, a second providing device, a third providing device, a fourth providing device, a first assembling device, a second assembling device, a third assembling device, and a fourth assembling device, wherein the first providing device is configured to provide a shell, the shell has an opening, and the inner surface of the shell is provided with a first limit part in a protruding manner; the second providing device is configured to provide an end cover; the third providing device is configured to provide an electrode assembly, and one side of the electrode assembly has a tab; the fourth providing device is configured to provide a current collector component, the current collector component includes a body part and a connecting part connected to the body part; the first assembling device is configured to connect the body part to the tab; the second assembling device is configured to accommodate the electrode assembly and the current collector component within the shell, and to position the electrode assembly on one side of the first limit part; the third assembling device is configured to connect the connecting part to the first limit part; and the fourth assembling device is configured to cover the end cover to the opening and position the end cover on the side of the first limit part away from the electrode assembly, wherein the body part includes a first welding region and a second welding region, the first welding region is located on the periphery of the second welding region, the first welding region and the second welding region are separated by the connection position between the connecting part and the body part, and both the first welding region and the second welding region are welded to the tab.

BRIEF DESCRIPTION OF DRAWINGS

In order to more clearly illustrate technical solutions of embodiments of the present application, drawings required for use in the embodiments will be described briefly below. It should be understood that the following drawings are merely illustrative of some embodiments of the present application, which therefore should not be understood as a limitation to the scope. For those of ordinary skill in the art, other related drawings can also be obtained according to these drawings without any inventive effort.

Figure 1:
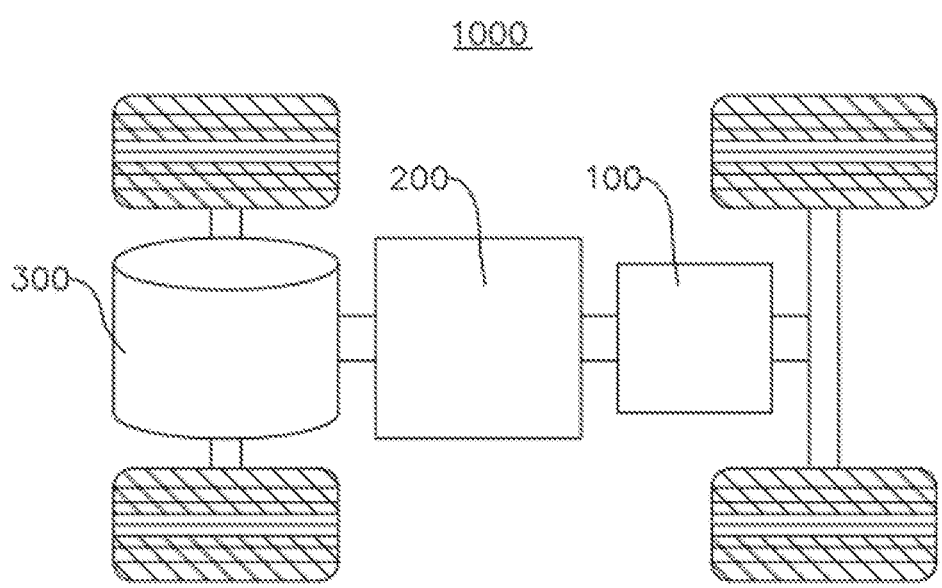
FIG. 1 is a schematic view of the structure of the vehicle provided in some embodiments of the present application.

Reference signs: 1000—vehicle; 100—battery; 10—box; 11—first part; 12—second part; 20—battery cell; 21—shell; 211—opening; 212—first limit part; 2121—abutting plane; 213—second limit part; 214—roller groove; 22—end cover; 23—electrode assembly; 231—tab; 24—current collector component; 241—body part; 2411—first welding region; 2412—second welding region; 242—connection part; 2421—extension section; 2422—connection section; 2423—notching groove; 2424—notch; 25—electrode terminal; 26—limit member; 27—sealing member; 200—controller; 300—motor; 2000—manufacturing equipment; 2100—first providing device; 2200—second providing device; 2300—third providing device; 2400—fourth providing device; 2500—first assembling device; 2600—second assembling device; 2700—third assembling device; and 2800—fourth assembling device.

DETAILED DESCRIPTION

In order to make the objectives, technical solutions and advantages of the embodiments of the present application clearer, the technical solutions in the embodiments of the present application will be described clearly below with reference to the drawings in the embodiments of the present application. Obviously, the embodiments described are some of, rather than all of, the embodiments of the present application. All the other embodiments obtained by those of ordinary skill in the art based on the embodiments of the present application without any creative effort shall fall within the scope of protection of the present application.

Unless otherwise defined, all technical and scientific terms used in the present application have the same meanings as those commonly understood by those skilled in the art to which the present application belongs. The terms used in the description of the present application are merely for the purpose of describing specific embodiments, but are not intended to limit the present application. The terms "comprise/include", "provide", and any variations thereof in the description and claims, as well as the brief description of the drawings described above of the present application are intended to cover non-exclusive inclusions. The terms "first", "second", etc. in the description and the claims of the present application or the drawings are used to distinguish different objects, rather than to describe specific sequences or primary and secondary relationships.

In the present application, the phrase "embodiment" mentioned means that the specific features, structures, or characteristics described with reference to the embodiments may be encompassed in at least one embodiment of the present application. The phrase at various locations in the description does not necessarily refer to the same embodiment, or an independent or alternative embodiment exclusive of another embodiment.

In the description of the present application, it should be noted that unless otherwise explicitly specified and defined, the terms "install", "link", "connect" and "attach" should be understood in a broad sense, for example, it may be a fixed connection, a detachable connection, or an integrated connection; and may be a direct connection, an indirect connection by means of an intermediate medium, or internal communication between two elements. For those of ordinary skill in the art, the specific meaning of the foregoing terms in the present application may be understood according to specific circumstances.

The term "and/or" in the present application is only a description for the association relationship of the associated object, indicating that there can be three types of relationships. For example, A and/or B can indicate three conditions: the presence of only A, the presence of both A and B, and the presence of only B. In addition, the character "/" in the present application generally indicates that the associated objects before and after have an "or" relationship.

In the embodiments of the present application, the same reference signs represent the same components, and for simplicity, detailed descriptions for the same components are omitted in different embodiments. It should be understood that the thickness, length, width, and other dimensions of various components in the embodiments of the present application shown in the drawings, as well as the overall thickness, length, width, and other dimensions of the integrated device, are only illustrative examples and should not constitute any limitations to the present application.

The term "multiple (a plurality of)" in the present application refers to two or more (including two).

In the present application, the battery cell can include a lithium ion secondary battery, a lithium ion primary battery, a lithium sulfur battery, a sodium lithium ion battery, a sodium ion battery or a magnesium ion battery, etc., which is not limited by the embodiments of the present application. The battery cell can be cylindrical, flat, or rectangular, or be of other shapes, which is also not limited by the embodiments of the present application. Battery cells are generally divided into three types according to the packaging method: cylindrical battery cell, square battery cell, and soft pack battery cell, which is also not limited by the embodiments of the present application.

The battery mentioned in the embodiments of the present application refers to a single physical module that includes one or more battery cells to provide higher voltage and capacity. For example, the batteries mentioned in the present application may include battery modules or battery packs, etc. Batteries generally include boxes used to encapsulate one or more battery cells or multiple battery modules. The box can prevent liquids or other foreign objects from affecting the charging or discharging of battery cells.

The battery cell includes a shell, electrode assemblies, and electrolyte, and the shell is used to accommodate the electrode assemblies and electrolyte. The electrode assembly is composed of a positive electrode plate, a negative electrode plate, and a separator. Battery cells mainly rely on metal ions moving between the positive and negative electrode plates to operate. The positive electrode plate includes a positive electrode current collector and a positive electrode active substance layer. The positive electrode active substance layer is coated on the surface of the positive electrode current collector, and the positive electrode current collector without the positive electrode active substance layer protrudes from the positive electrode current collector coated by the positive electrode active substance layer. The positive electrode current collector without the positive electrode active substance layer is used as the positive electrode tab. Taking lithium ion batteries as an example, the material for the positive electrode current collector can be aluminum, and the active substance of the positive electrode can be lithium cobalt oxide (lithium cobaltate), lithium iron phosphate, ternary lithium, or lithium manganese oxide (lithium manganate). The negative electrode plate includes a negative electrode current collector and a negative electrode active substance layer. The negative electrode active substance layer is coated on the surface of the negative electrode current collector, and the negative electrode current collector without the negative electrode active substance layer protrudes from the negative electrode current collector coated by the negative electrode active substance layer. The negative electrode current collector without the negative electrode active substance layer is used as the negative electrode tab. The material for the negative electrode current collector can be copper, and the active substance of the negative electrode can be carbon, silicon or the like. In order to ensure that fusing does not occur under a high current, the number of positive electrode tabs is multiple and stacked together, and the number of negative electrode tabs is multiple and stacked together.

The material of the separator can be PP (polypropylene) or PE (polyethylene), etc. In addition, the electrode assembly can be of a wound structure or a laminated structure (stacked structure), and the embodiments of the present application are not limited to this.

Batteries have outstanding advantages such as high energy density, low environmental pollution, high power density, long service life, wide adaptability, and low self discharge coefficient, which are an important component of the development of new energy. The battery cell of the battery is obtained by assembling a positive electrode plate, a negative electrode plate, and a separator to an electrode assembly (bare cell) by means of winding or stacking, then putting the electrode assembly into a shell, covering an end cover, and finally injecting the electrolyte. However, with the continuous development of battery technology, higher requirements have been put forward for the quality and use safety of batteries. Therefore, the safety performance of the battery cell determines the safety of the battery during use.

The inventor found that for a general battery cell, the electrode assembly needs to be electrically connected to the shell to make the shell be the positive or negative output terminal of the battery cell. In order to facilitate the electrical connection between the tab of the electrode assembly and the shell, a current collector component is usually installed inside the shell, which is connected to the shell and the tab of the electrode assembly (in which the tab is a full tab, which is connected to the current collector component after being flattened), so as to achieve electrical connection between the electrode assembly and the shell. In existing technology, in order to ensure the electrical connection effect between the electrode assembly and the shell, a protrusion is usually set on the inner wall of the shell, and a boss for being welded with the protrusion is correspondingly set on the current collector component to ensure the electrical connection effect between the electrode assembly and the shell, and to achieve the built-in weld mark between the current collector component and the shell, thereby reducing the effect of the weld mark on the sealing between the end cover of the shell and the shell. However, in this structure of battery cell, the outer ring of the tab of the electrode assembly is not welded to the current collector component, resulting in local overcurrent between the outer ring of the tab and the current collector component, which makes the battery cell highly susceptible to polarization and even lithium precipitation during the later cyclic charging and discharging process, which leads to significant safety hazards in the later use of battery cell.

Based on the above considerations, in order to solve the problem of significant safety hazards in the later use of battery cell, which is not conducive to the safety of consumers' use, the inventor has conducted in-depth research and designed a battery cell, which includes a shell, an end cover, a electrode assembly, and a current collector component. The shell is provided with an opening, and the inner surface of the shell is provided with a first limit part in a protruding manner. The end cover covers the opening of the shell. The electrode assembly is arranged inside the shell and is located on the side of the first limit part away from the end cover. The current collector component is accommodated within the shell, which includes a body part and a connecting part connected to the body part. The body part is connected to the tab of the electrode assembly, and the connecting part is connected to the first limit part. The body part includes a first welding region and a second welding region. The first welding region and the second welding region are separated by the connection position between the connecting part and the body part, and the first welding region is located on the outer periphery of the second welding region. The first welding region and the second welding region are both welded to the tab of the electrode assembly.

In the above battery cell, the inner surface of the shell is provided with a first limit part in a protruding manner. The electrode assembly and end cover are respectively arranged on both sides of the first limit part, and the connecting part of the current collector component is connected to the first limit part, so as to achieve electrical connection between the electrode assembly and the shell through the current collector component. The battery cell with this structure, on one hand, can effectively improve the connection reliability between the current collector component and the shell, which is beneficial for improving the electrical connection effect between the electrode assembly and the shell, and on the other hand, the built-in connection position between the current collector component and the shell can be achieved. That is to say, through this structure, the connection position between the current collector component and the shell can be located on one side of the end cover, thereby reducing the impact on the sealing between the end cover of the shell and the shell, so as to ensure the sealing effect between the end cover and the shell.

In addition, by welding both the first welding region and the second welding region formed by separating the body part through the connecting part onto the tab of the electrode assembly, the connection relationship between the outer ring of the tab and the current collector component can be effectively ensured, thereby reducing the occurrence of local overcurrent between the outer ring of the tab and the current collector component, and effectively reducing the risk of polarization and lithium precipitation of the battery cell during the later cyclic charging and discharging process, so as to reduce the safety hazards of battery cell during later use, which is beneficial to ensuring the safety of consumers' use.

The battery cell disclosed in the embodiments of the present application can be used in, but is not limited to, electrical device such as vehicles, ships, or aircraft. The battery cell, battery, etc. disclosed in the present application can be used to form the power supply system of the electrical device, so as to effectively reduce the risk of polarization and lithium precipitation of the battery cell, thereby improving the use safety of battery.

The embodiment of the present application provides an electrical device using a battery as a power source, which can be but is not limited to mobile phones, tablet computers, laptops, electric toys, electric tools, electromobile, electric vehicles, ships, spacecraft, and so on. In the above, electric toys can include fixed or mobile electric toys, such as game consoles, electric car toys, electric ship toys and electric aircraft toys, and spacecraft can include aircraft, rockets, space shuttles and spaceships, etc.

For the convenience of explanation, the following embodiment takes an electrical device in one embodiment of the present application being the vehicle 1000 as an example to explain.

Referring to FIG. 1, FIG. 1 is a structural schematic view of the vehicle 1000 provided in some embodiments of the present application. The vehicle 1000 can be a fuel powered vehicle, a gas powered vehicle, or a new energy vehicle. The new energy vehicle can be a pure electric vehicle, a hybrid electric vehicle, or an extended range vehicle, etc. The interior of vehicle 1000 is equipped with battery 100, which can be installed at the bottom, head, or tail of vehicle 1000. Battery 100 can be used for the power supply for the vehicle 1000. For example, battery 100 can serve as the operating power supply for vehicle 1000. The vehicle 1000 can also include a controller 200 and a motor 300, wherein the controller 200 is used to control the battery 100 to supply power to the motor 300, for example, used for the working power demand during startup, navigation, and running of the vehicle 1000.

In some embodiments of the present application, the battery 100 can not only serve as the operating power source for vehicle 1000, but also as the driving power source for vehicle 1000, thereby replacing or partially replacing fuel or natural gas to provide driving power for vehicle 1000.

Figure 2:
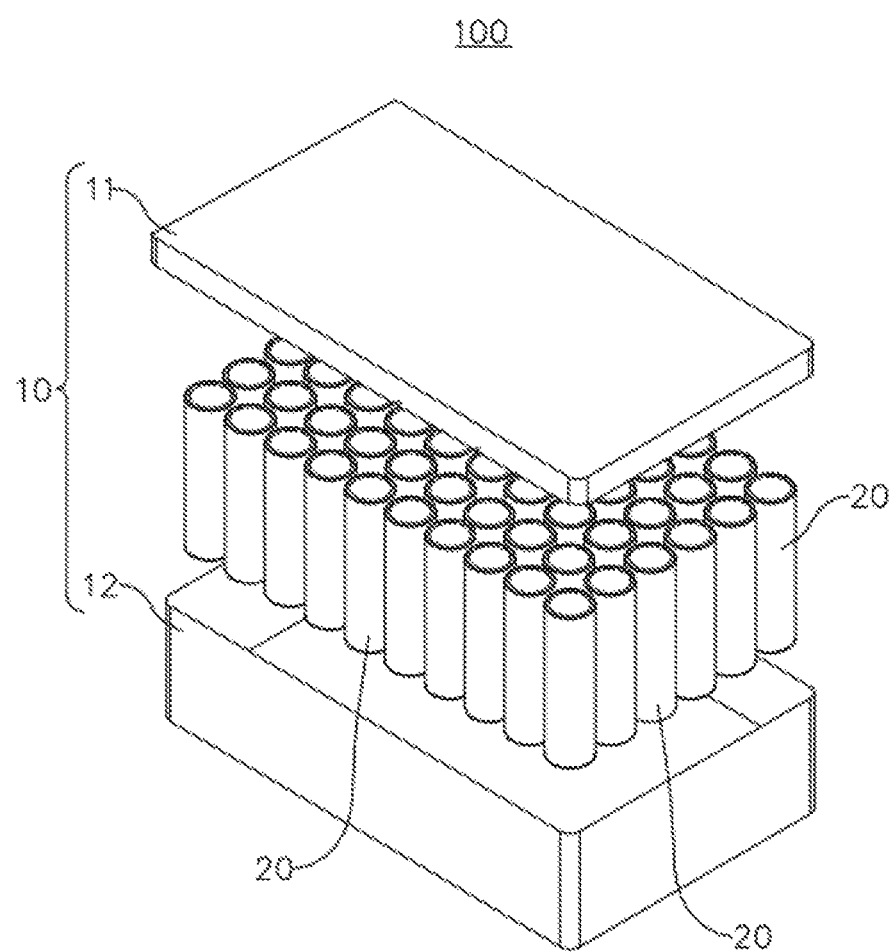
FIG. 2 is a structural explosion view of the battery provided in some embodiments of the present application.

Referring to FIG. 2, FIG. 2 is a structural explosion view of the battery 100 provided in some embodiments of the present application. The battery 100 includes a box 10 and a battery cell 20, which is accommodated within the box 10. In the above, the box 10 is used to provide assembly space for the battery cell 20, and the box 10 can be of various structures. In some embodiments, the box 10 may include a first part 11 and a second part 12, with the first part 11 and the second part 12 covering each other. The first part 11 and the second part 12 jointly define a assembly space for accommodating the battery cell 20. The second part 12 can be in a hollow structure with an opening at one end, the first part 11 can be in a plate-shaped structure, and the first part 11 is covered on the opening side of the second part 12 to jointly define the assembly space by the first part 11 and the second part 12. The first part 11 and the second part 12 can also both be in hollow structure with an opening on one side, and the opening side of the first part 11 is covered on the opening side of the second part 12. Of course, the box 10 formed by the first part 11 and the second part 12 can be of various shapes, such as cylinder, cuboid, etc.

In the battery 100, the battery cells 20 can be multiple, and multiple battery cells 20 can be connected in series, parallel, or hybrid. Hybrid connection means that both series connection and parallel connection exist among multiple battery cells 20. Multiple battery cells 20 can be directly connected in series, parallel, or hybrid together, and then the whole composed of multiple battery cells 20 can be accommodated in the box 10. Of course, the battery 100 can also be in the form of a battery module composed of multiple battery cells 20 that are first connected in series, parallel, or hybrid. Multiple battery modules are then connected in series, parallel, or hybrid to form a whole and accommodated in the box 10. The battery 100 may also include other structures, for example, the battery 100 may also include a busbar component for achieving electrical connection between multiple battery cells 20.

In the above, each battery cell 20 can be a secondary battery or a primary battery; and can also be a lithium sulfur battery, sodium ion battery, or magnesium ion battery, but is not limited thereto. The battery cell 20 can be cylindrical, flat, or rectangular, or be of other shapes. As an example, in FIG. 2, the battery cell 20 is cylindrical.

Figure 3:
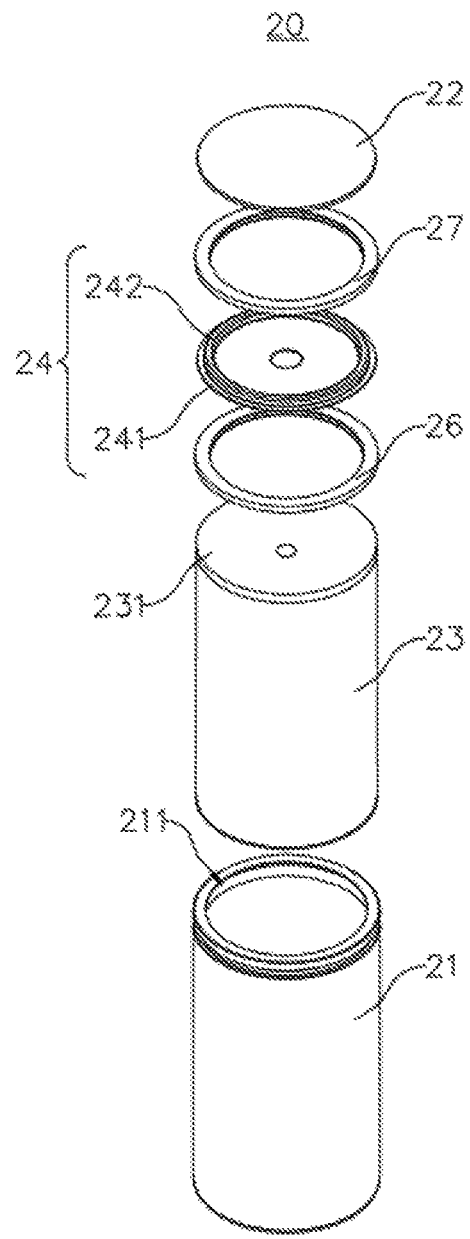
FIG. 3 is a structural explosion view of battery cell provided in some embodiments of the present application.
Figure 4:
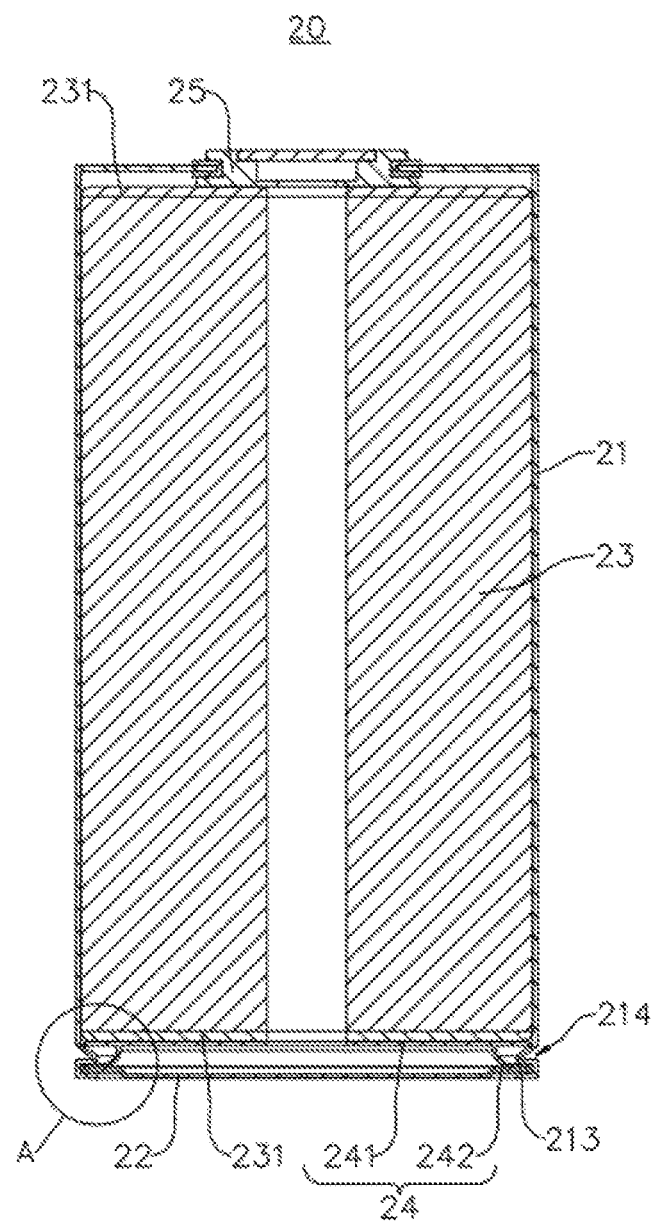
FIG. 4 is a sectional view of battery cell provided in some embodiments of the present application.
Figure 5:
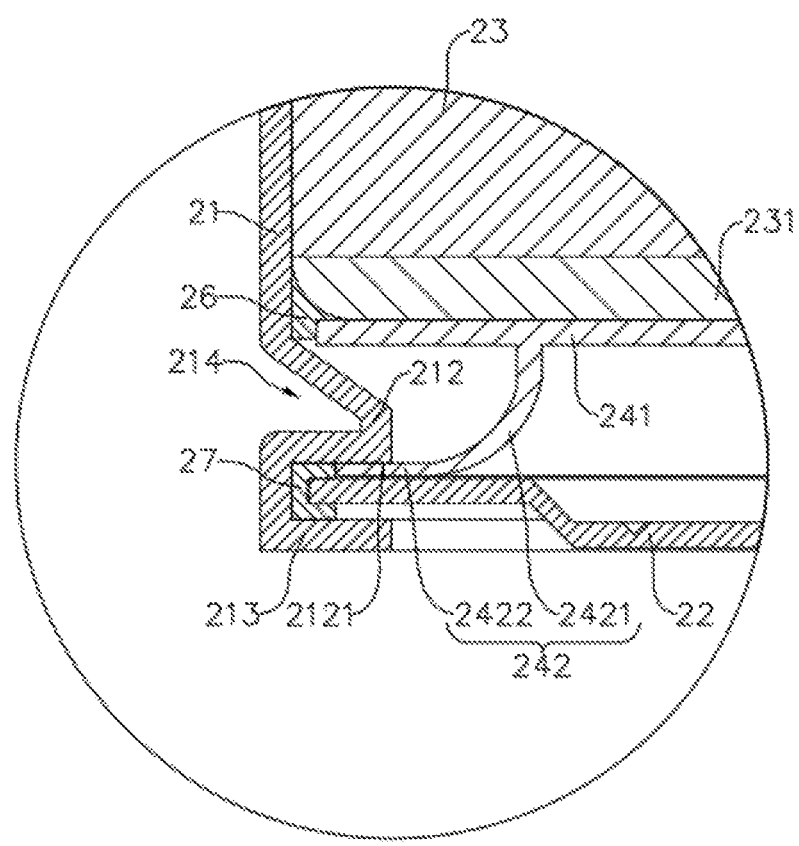
FIG. 5 is a partial enlarged view of the A position of the battery cell shown in FIG. 4.
Figure 6:
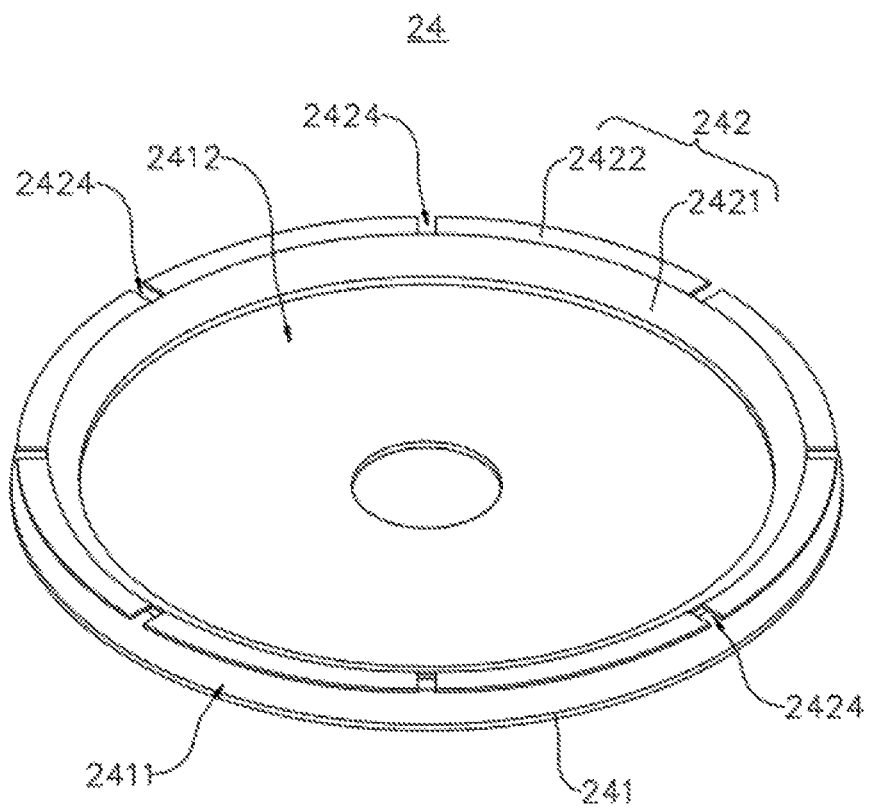
FIG. 6 is a structural schematic view of the current collector component provided in some embodiments of the present application.

According to some embodiments of the present application, referring to FIGS. 3, 4, and 5, FIG. 3 is an exploded view of the structure of the battery cell 20 provided in some embodiments of the present application; FIG. 4 is a sectional view of the battery cell 20 provided in some embodiments of the present application; and FIG. 5 is a partial enlarged view of A position of the battery cell 20 shown in FIG. 4. The present application provides a battery cell 20, which includes a shell 21, an end cover 22, an electrode assembly 23, and a current collector component 24. The housing 21 has an opening 211, and the inner surface of the housing 21 is provided with a first limit part 212 in a protruding manner. The end cover 22 covers the opening 211. The electrode assembly 23 is accommodated within the shell 21, and is located on the side of the first limit part 212 away from the end cover 22, and the side of the electrode assembly 23 facing the end cover 22 has a tab 231. The first limit part 212 is configured to limit the movement of the end cover 22 in the direction facing the electrode assembly 23. The current collector component 24 is accommodated within the shell 21, which includes a body part 241 and a connecting part 242 connected to the body part 241. The body part 241 is used to connect the tab 231, and the connecting part 242 is used to connect the first limit part 212. As shown in FIG. 6, FIG. 6 is a structural schematic view of the current collector component 24 provided in some embodiments of the present application. The body part 241 includes a first welding region 2411 and a second welding region 2412. The first welding region 2411 is located on the outer periphery of the second welding region 2412. The first welding region 2411 and the second welding region 2412 are separated by the connection position between the connecting part 242 and the body part 241. The first welding region 2411 and the second welding region 2412 are both welded to the tab 231.

The first welding region 2411 is located on the outer periphery of the second welding region 2412. The first welding region 2411 and the second welding region 2412 are separated by the connection position between the connecting part 242 and the body part 241, that is, two regions are formed on the body part 241, which are both welded to the tab 231. The two regions are respectively the first welding region 2411 and the second welding region 2412, the first welding region 2411 and the second welding region 2412 are separated by the connection position between the connecting part 242 and the body part 241, and the first welding region 2411 is located on the outer peripheral of the connecting part 242, while the second welding region 2412 is located on the inner peripheral of the connecting part 242.

For example, the first welding region 2411 and the second welding region 2412 of the body part 241 are welded to the tab 231 of the electrode assembly 23 by laser welding.

For example, the body part 241 of the current collector component 24 is in a circular disc structure.

Optionally, the shell 21 can also be used to accommodate electrolyte, such as electrolyte solution. The shell 21 can be in various structural forms. The material of shell 21 can also be various, such as copper, iron, aluminum, steel, aluminum alloy, etc.

When assembling battery cell 20, the electrode assembly 23 can be first placed into the shell 21, and electrolyte can be filled into the shell 21. Then, the end cover 22 covers the opening 211 of the shell 21 and forms a sealed connection, so as to form a sealed space for accommodating the electrode assembly 23 and electrolyte.

The shell 21 can be of various shapes, such as cylinder, cuboid, etc. The shape of shell 21 can be determined based on the specific shape of electrode assembly 23. For example, if electrode assembly 23 is a cylindrical structure, it can be selected as a cylindrical structure; and if the electrode assembly 23 is a cuboid structure, the cuboid structure can be selected. Of course, the end cover 22 can also be of various structures, such as a plate-shaped structure or a hollow structure with an opening 211 at one end. As an example, in FIG. 3, the electrode assembly 23 is a cylindrical structure, then the shell 21 is a cylindrical shell 21.

It can be understood that the battery cell 20 is not limited to the above structure, and the battery cell 20 can also be other structures. For example, the battery cell 20 includes a shell 21 and two end covers 22. The shell 21 is in a hollow structure with opposite openings 211 on both sides, and each end cover 22 correspondingly covers one opening 211 of the shell 21 and forms a sealed connection, so as to form a sealed space for accommodating the electrode assembly 23 and electrolyte. In the embodiment that the shell 21 is in a hollow structure with an opening 211 at one end, as shown in FIG. 4, an electrode terminal 25 can be provided at one end of the shell 21 that is away from the end cover 22. The electrode terminal 25 is insulated and connected to the shell 21, which means that there is no current conduction between the electrode terminal 25 and the shell 21. Both ends of the electrode assembly 23 have tabs 231 (which are positive electrode tab and negative electrode tab, respectively), and one of the two tabs 231 is electrically connected to the shell 21 through the current collector component 24, and the other one is electrically connected to electrode terminal 25. Of course, the tab 231 can be directly connected to the electrode terminal 25, such as welding or abutting, or the two can be connected through other components. For example, the tab 231 is welded to or abuts against other components first, and then welded to or abuts against the electrode terminal 25.

The electrode assembly 23 is a component in the battery cell 20 that undergoes electrochemical reactions. The electrode assembly 23 can include a positive electrode plate, a negative electrode plate, and a separator. The electrode assembly 23 can be in a wound structure formed by winding the positive electrode plate, the separator, and the negative electrode plate, or a stacked structure formed by stacking the positive electrode plate, the separator, and the negative electrode plate. As an example, in FIG. 3, the electrode assembly 23 is in a wound structure formed by winding the positive electrode plate, the separator, and the negative electrode plate.

In some embodiments, the battery cell 20 may also include a pressure relief mechanism, which is installed on the end cover 22 or on the shell 21. The pressure relief mechanism is used to release the pressure inside the battery cell 20 when the pressure or temperature inside the battery cell 20 reaches a predetermined value.

For example, a pressure relief mechanism can be a component such as an explosion-proof valve, explosion-proof sheet, air valve, pressure relief valve, or safety valve.

The inner surface of the shell 21 is provided with a first limit part 212 in a protruding manner. The electrode assembly 23 and end cover 22 are respectively arranged on both sides of the first limit part 212, and the connecting part 242 of the current collector component 24 is connected to the first limit part 212, so as to achieve electrical connection between the electrode assembly 23 and the shell 21 through the current collector component 24. The battery cell 20 with this structure, on one hand, can effectively improve the connection reliability between the current collector component 24 and the shell 21, which is beneficial for improving the electrical connection effect between the electrode assembly 23 and the shell 21, and on the other hand, the built-in connection position between the current collector component 24 and the shell 21 can be achieved. That is to say, through this structure, the connection position between the current collector component 24 and the shell 21 can be located on one side of the end cover 22, thereby reducing the impact on the sealing between the end cover 22 of the shell 21 and the shell 21, so as to ensure the sealing effect between the end cover 22 and the shell 21. In addition, by welding both the first welding region 2411 and the second welding region 2412 formed by separating the body part 241 through the connecting part 242 onto the tab 231 of the electrode assembly 23, the connection relationship between the outer ring of the tab 231 and the current collector component 24 can be effectively ensured, thereby reducing the occurrence of local overcurrent between the outer ring of the tab 231 and the current collector component 24, and effectively reducing the risk of polarization and lithium precipitation of the battery cell 20 during the later cyclic charging and discharging process, so as to reduce the safety hazards of battery cell 20 during later use, which is beneficial to ensuring the safety of consumers' use.

According to some embodiments of the present application, referring to FIGS. 5 and 6, along the radial direction of the current collector component 24, the distance from the connection position between the connecting part 242 and the body part 241 to the outer edge of the body part 241 is not less than 2 mm.

In the radial direction of the current collector component 24, the distance from the connection position between the connecting part 242 and the body part 241 to the outer edge of the body part 241 is not less than 2 mm, that is, in the direction from the center position of the current collector component 24 to the edge of the current collector component 24 or in the direction from the edge of the current collector component 24 to the center position of the current collector component 24, the distance from the connection position between the connecting part 242 and the body part 241 to the outer edge of the body part 241 is greater than or equal to 2 mm.

For example, along the radial direction of the current collector component 24, the distance from the connection position between the connecting part 242 and the body part 241 to the outer edge of the body part 241 is 5 mm.

By setting the distance from the connection position of the connecting part 242 and the body part 241 to the outer edge of the body part 241 to be greater than or equal to 2 mm, it is possible to ensure that the first welding region 2411 located on the outer periphery of the second welding region 2412 has sufficient space to be welded with the tab 231, so as to meet the weldable region of the first welding region 2411, which is conducive to improving the problem of the outer ring of the tab 231 being unable to weld with the current collector component 24, so as to achieve the connection between the outer ring of the tab 231 and the current collector component 24.

Figure 7:
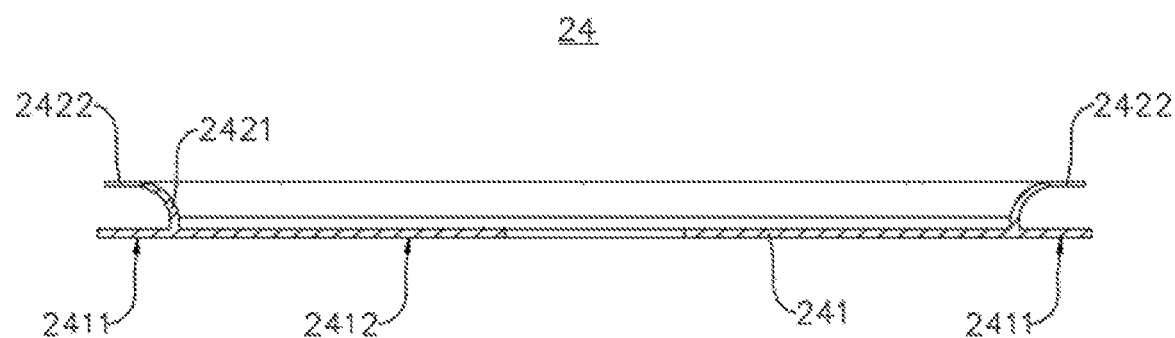
FIG. 7 is a sectional view of the current collector component provided in some embodiments of the present application.
Figure 8:
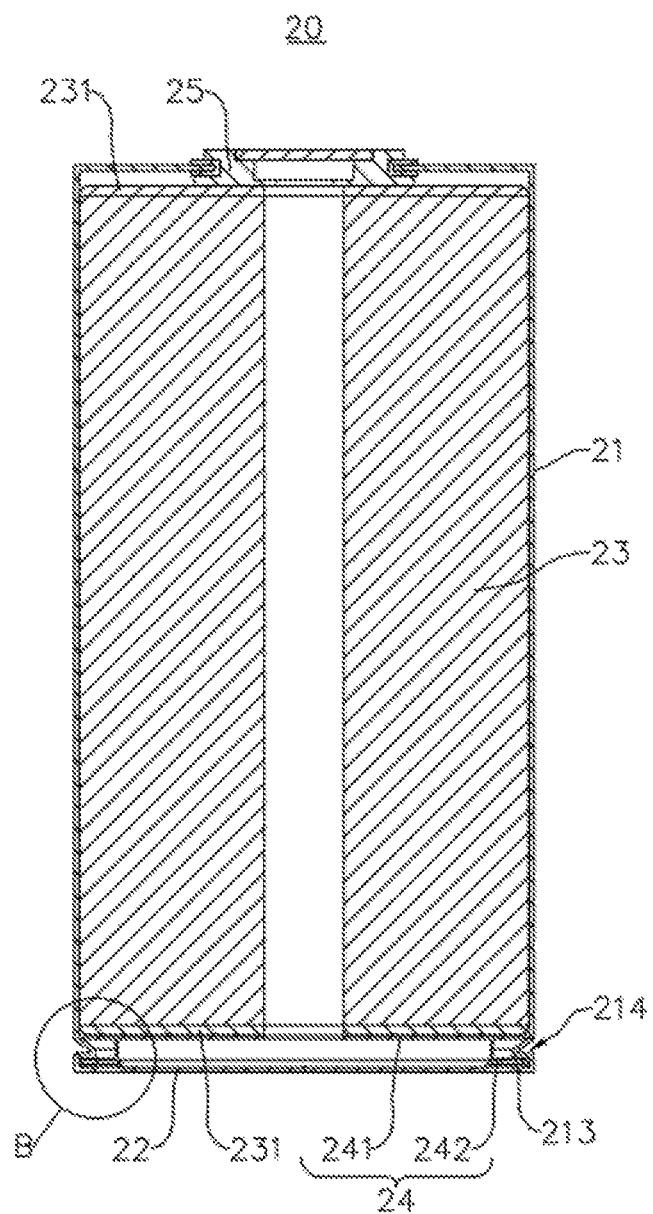
FIG. 8 is a sectional view of the battery cell provided in some other embodiments of the present application.

According to some embodiments of the present application, referring to FIGS. 5 and 6, and further referring to FIG. 7, FIG. 7 is a sectional view of the current collector component 24 provided in some embodiments of the present application. The connecting part 242 includes an extension section 2421 and a connection section 2422. The extension section 2421 is connected to the body part 241, and extends from the body part 241 in a direction away from the electrode assembly 23. The extension section 2421 is at least partially located on the inner circumference of the first limit part 212. The connection section 2422 is connected to the extension section 2421, and at least part of the connection section 2422 abuts against the side of the first limit part 212 that is away from the electrode assembly 23 and is connected to the first limit part 212.

The connection section 2422 is connected to one end in the extension direction of the extension section 2421 that is far away from the connection position between the extension section 2421 and the body part 241, and the extension section 2421 extends out of the side of the first limit part 212 that is away from the electrode assembly 23, so that the connection section 2422 can abut against and be connected to the side of the first limit part 212 that is away from the electrode assembly 23.

Optionally, the connection section 2422 is connected to the first limit part 212 to achieve electrical connection between the connection section 2422 and the first limit part 212. The connection section 2422 and the first limit part 212 can be welded or in contact with each other to form an electrical connection between the connection section 2422 and the first limit part 212, thereby achieving current conduction between the electrode assembly 23 and the shell 21.

For example, the connection section 2422 is welded to the side of the first limit part 212 away from the electrode assembly 23.

The connecting part 242 is provided with an extension section 2421 and a connection section 2422. By setting the extension section 2421 on the inner periphery of the first limit part 212 and connecting the connection section 2422 to one end of the extension section 2421, the connection section 2422 can abut against the side of the first limit part 212 away from the electrode assembly 23 and be connected to the first limit part 212, thereby ensuring the connection strength and stability between the current collector component 24 and the first limit part 212 of the shell 21, which is beneficial to improving the electrical connection effect between the current collector component 24 and the shell 21, and to enhancing the service life of the battery cell 20.

According to some embodiments of the present application, referring to FIGS. 6 and 7, along the extension direction of the extension section 2421, the thickness of the extension section 2421 gradually decreases from one end connected to the body part 241 to one end connected to the connection section 2422.

Along the extension direction of the extension section 2421, the thickness of the extension section 2421 gradually decreases from one end connected to the body part 241 to one end connected to the connection section 2422. That is to say, the thickness of the extension section 2421 decreases as it approaches the connection section 2422 from one end connected to the body part 241.

Optionally, the thickness of one end of the extension section 2421 connected to the body part 241 is twice that of one end of the extension section 2421 connected to the connection section 2422. For example, the thickness of one end of the extension section 2421 connected to the body part 241 is 0.4 mm, and the thickness of one end of the extension section 2421 connected to the connection section 2422 is 0.2 mm.

By setting the thickness of the extension section 2421 to gradually decrease from one end connected to the body part 241 to the other end connected to the connection section 2422, it is possible to make it easier for the extension section 2421 to bend along the radial direction of the current collector component 24 towards the direction near the first limit part 212, such that the connection section 2422 can abut against the side of the first limit part 212 away from the electrode assembly 23 and be connected with the first limit part 212, in which the structure is simple and easy to implement and process.

According to some embodiments of the present application, referring continuously to FIGS. 6 and 7, the extension section 2421 extends along an arc trajectory from one end connected to the body part 241 to one end connected to the connection section 2422, with the center of the arc trajectory located on the outer circumference of the extension section 2421.

In the above description, the extension section 2421 extends along an arc trajectory from one end connected to the body part 241 to one end connected to the connection section 2422, that is, the extension section 2421 is bent into an arc structure along the radial direction of the current collector component 24 towards the direction near the first limit part 212. The center of the arc structure is located on the radial direction of the current collector component 24 on the side of the extension section 2421 near the first limit part 212, that is to say, the section of the extension section 2421 is a structure that folds along the radial direction of the current collector component 24 towards the direction near the first limit part 212.

By setting the extension section 2421 to a structure that extends in an arc trajectory from one end connected to the body part 241 to the other end connected to the connection section 2422, on one hand, it is convenient for processing and manufacturing, and on the other hand, it is possible to reduce the risk of fracture of the extension section 2421 during the bending process.

Figure 9:
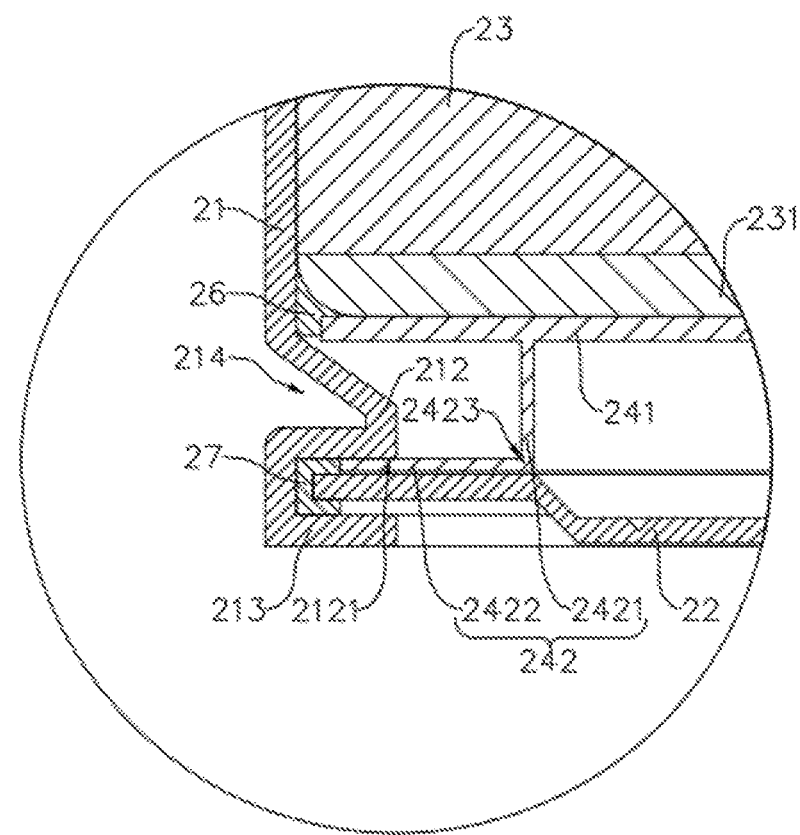
FIG. 9 is a partial enlarged view of the B position of the battery cell shown in FIG. 8.
Figure 10:
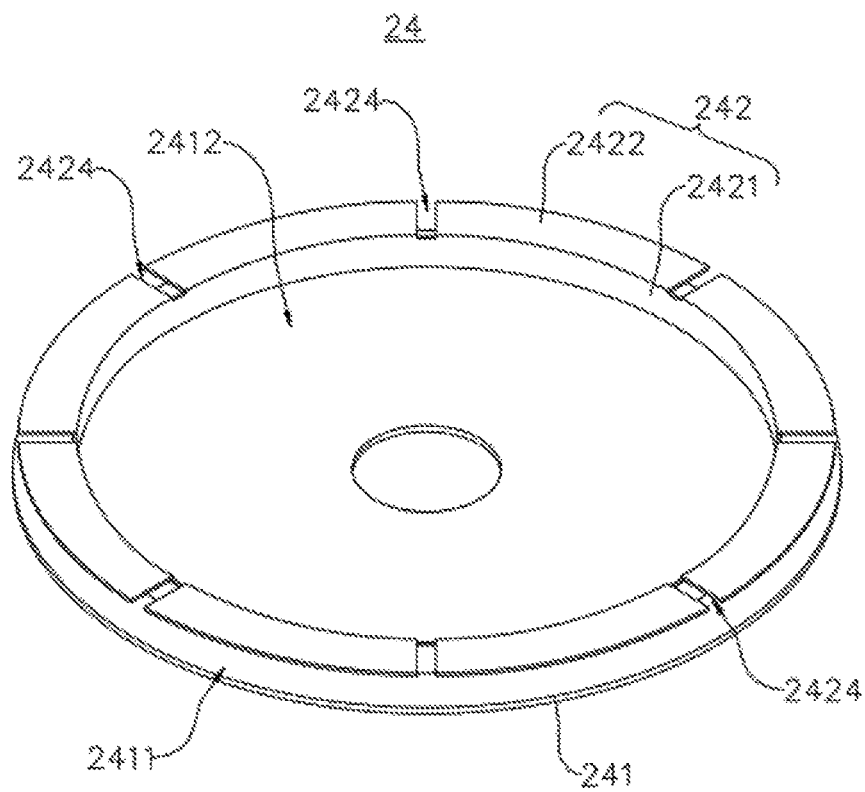
FIG. 10 is a structural schematic view of the current collector component provided in some other embodiments of the present application.
Figure 11:
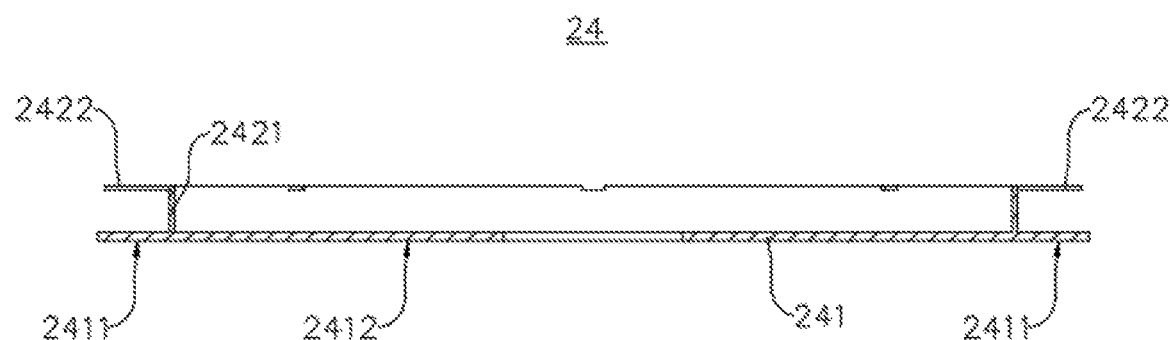
FIG. 11 is a sectional view of the current collector component provided in some other embodiments of the present application.

According to some embodiments of the present application, as shown in FIGS. 8 to 11, FIG. 8 is a sectional view of the battery cell 20 provided in some other embodiments of the present application; FIG. 9 is a partial enlarged view of B position of the battery cell 20 shown in FIG. 8; FIG. 10 is a structural schematic view of the current collector component 24 provided in some other embodiments of the present application; and FIG. 11 is a sectional view of the current collector component 24 provided in some other embodiments of the present application. The connection position between the connection section 2422 and the extension section 2421 is provided with a notching groove 2423 for the connection section 2422 to bend relative to the extension section 2421.

The connection position between the connection section 2422 and the extension section 2421 forms a notching groove 2423 for the bending of the connection section 2422 relative to the extension section 2421, that is, a notching groove 2423 is provided on the outer surface of the connecting part 242, and the notching groove 2423 is located at the connection position between the connection section 2422 and the extension section 2421, which means that a weakened region is formed between the connection section 2422 and the extension section 2421.

As an example, in FIG. 9, the depth of the notching groove 2423 is 0.1 mm, and the notching groove 2423 is a V-shaped groove. Of course, in other embodiments, the depth of notching groove 2423 can also be other depths, such as 0.08 mm, 0.12 mm, or 0.15 mm. Similarly, in other embodiments, the structure of the notching groove 2423 can also be a U-shaped groove structure, etc.

A notching groove 2423 is formed at the connection position between the connection section 2422 and the extension section 2421, thereby making the connection section 2422 bent toward the direction near the first limit part 212 along the radial direction of the current collector component 24 relative to the extension section 2421, such that the connection section 2422 can abut against the side of the first limit part 212 away from the electrode assembly 23 and be connected with the first limit part 212, in which the structure is simple and easy to implement.

According to some embodiments of the present application, as shown in FIG. 11, the extension direction of the extension section 2421 is consistent with the thickness direction of the body part 241.

For example, along the extension direction of the extension section 2421, the thickness of the extension section 2421 remains unchanged from one end connected to the body part 241 to one end connected to the connection section 2422. Of course, in some embodiments, the thickness of the extension section 2421 can also be set to gradually decrease from one end connected to the body part 241 to one end connected to the connection section 2422.

The extension direction of the extension section 2421 is set to be consistent with the thickness direction of the body part 241, so as to facilitate the processing of notching groove 2423 at the connection position between the extension section 2421 and the connection section 2422, thereby reducing the manufacturing difficulty of the current collector component 24.

According to some embodiments of the present application, referring to FIGS. 5 and 6, the first limit part 212 and the connecting part 242 are both in a circular structure arranged along the circumferential direction of the current collector component 24.

The circumferential direction of the current collector component 24 is the circumferential direction centered around the center position of the current collector component 24, that is, the first limit part 212 and the connecting part 242 are both structures surrounding the center position of the current collector component 24.

The first limit part 212 and the connecting part 242 are both set to be in a circular structure extending along the circumferential direction of the current collector component 24, which is beneficial for improving the structural strength of the first limit part 212 and the connecting part 242, thereby effectively improving the service life of the battery cell 20.

According to some embodiments of the present application, as shown in FIG. 6, the connection section 2422 is provided with multiple notches 2424, which are arranged at intervals along the circumference direction of the current collector component 24. Along the circumferential direction of the current collector component 24, the connection section 2422 forms a bending region between each adjacent two notches 2424, wherein the bending region can bend toward the outer circumference of the extension section 2421 relative to the extension section 2421.

Along the circumferential direction of the current collector component 24, the connection section 2422 forms a bending region between each adjacent two notches 2424, that is, the connection section 2422 is divided into multiple parts arranged at intervals along the circumferential direction of the current collector component 24 by multiple notches 2424 arranged on the connection section 2422, in which each part is a bending region that can be bent relative to the extension section 2421. That is to say, the connection section 2422 is a discontinuous structure that extends along the circumferential direction of the current collector component 24.

As an example, in FIG. 6, there are eight notches 2424 arranged on the connection section 2422, which are evenly arranged at intervals along the circumferential direction of the current collector component 24. Of course, in other embodiments, the number of notches 2424 set on the connection section 2422 can also be six, seven, nine, or ten.

The connection section 2422 is provided with multiple notches 2424, and the multiple notches 2424 are arranged at intervals along the circumferential direction of the connection section 2422, such that a bending region can be formed between each adjacent two notches 2424 for connecting to the first limit part 212. The connection section 2422 with this structure, on the one hand, can be connected to the side of the first limit part 212 away from the electrode assembly 23 after the connection section 2422 is bent relative to the extension section 2421, and on the other hand, can effectively alleviate the phenomenon of wrinkles in the connection section 2422 after bending relative to the extension section 2421.

Further, the connection section 2422 is welded with the first limit part 212 to form a weld mark, and the length of the weld mark is not less than half of the perimeter of the first limit part 212 along the circumferential direction of the current collector component 24.

In the above description, the length of the weld mark is not less than half of the perimeter of the first limit part 212 along the circumferential direction of the current collector component 24, which means that the total welding length of the connection section 2422 and the first limit part 212 is not less than half of the perimeter of the first limit part 212 in the circumferential direction of the current collector component 24.

By setting the length of the weld mark formed by welding the connection section 2422 and the first limit part 212 on the circumferential direction of the current collector component 24 to be greater than or equal to half of the perimeter of the first limit part 212, on one hand, it is beneficial for improving the stability and reliability of the connection between the connection section 2422 and the first limit part 212, so as to improve the service life and use reliability of the battery cell 20, and on the other hand, it can ensure the current guiding area between the connection section 2422 and the first limit part 212, so as to reduce the risk of temperature rise inside the battery cell 20 caused by excessive current between the connection section 2422 and the first limit part 212.

According to some embodiments of the present application, as shown in FIGS. 5 and 6, an abutting plane 2121 for the connection section 2422 to abut is formed at the side of the first limit part 212 away from the electrode assembly 23.

The side of the first limit part 212 that is away from the electrode assembly 23 forms an abutting plane 2121, which means that the side of the first limit part 212 for the connection section 2422 to abut and connect is a flat structure.

Optionally, the abutting plane 2121, the body part 241, and the connection section 2422 are parallel to each other, and in the radial direction of the current collector component 24, the connecting part 242 is connected to the abutting plane 2121 of the first limit part 212 with a length greater than or equal to 1 mm.

By setting the side of the first limit part 212 that is away from the electrode assembly 23 as an abutting plane 2121, it is convenient for the connection section 2422 to abut and connect, and is conducive to increasing the connection area and contact area between the connection section 2422 and the first limit part 212, so as to improve the connection stability and current guiding stability between the connection section 2422 and the first limit part 212.

According to some embodiments of the present application, as shown in FIGS. 3, 4, and 5, the battery cell 20 may also include a limit member 26. The limit member 26 is accommodated within the shell 21, and is at least partially located between the inner surface of the shell 21 and the outer surface of the body part 241, so as to limit the radial movement of the body part 241 along the current collector component 24.

Optionally, the portion of the limit member 26 located between the inner surface of the shell 21 and the outer surface of the body part 241 is of a circular structure extending along the circumference direction of the current collector component 24, that is, the first limiting groove of the body part 241 for accommodating the current collector component 24 is arranged on one side of the limit member 26 facing the end cover 22. Of course, in other embodiments, the limit member 26 can also be of other structures. For example, multiple protrusions are arranged on one side of the limit member 26 facing the end cover 22. The multiple protrusions are arranged at intervals along the circumferential direction of the current collector component 24, and the protrusions extend between the inner surface of the shell 21 and the outer surface of the body part 241.

For example, the material of the limit member 26 can be polyimide, polyethylene, polyvinylidene fluoride or polytetrafluoroethylene.

A limit member 26 is set between the inner surface of the shell 21 and the outer surface of the body part 241 to limit the current collector component 24 to a certain extent through the limit member 26, thereby limiting the radial movement of the current collector component 24 relative to the shell 21, so as to reduce the risk of falling off of the connecting part 242 and the first limit part 212 due to the movement of the current collector component 24 relative to the shell 21, thereby ensuring the use stability and reliability of the battery cell 20, and effectively improving the service life of battery cell 20.

Further, the limit member 26 is in an interference fit with the body part 241.

In the above description, the limit member 26 is in an interference fit with the body part 241, that is, the groove wall of the first limiting groove of the limit member 26 used to accommodate the body part 241 of the current collector component 24 is in an interference fit with the body part 241. That is to say, in the radial direction of the current collector component 24, the diameter of the first limiting groove is smaller than the diameter of the body part 241.

As an example, the diameter of the first limiting groove is less than the diameter of the body part 241 by 0.1 mm.

By setting an interference fit between the body part 241 and the limit member 26, on one hand, this structure can effectively increase the connection firmness between the body part 241 and the limit member 26, thereby better limiting the radial movement of the current collector component 24 relative to the shell 21, and on the other hand, it can also play a certain limiting role in the axial movement of the current collector component 24 relative to the shell 21.

According to some embodiments of the present application, referring to FIG. 5, the limit member 26 is at least partially located between the inner surface of the shell 21 and the outer surface of the tab 231, and the limit member 26 has a positioning surface that fits with the outer surface of the tab 231.

The limit member 26 is at least partially located between the inner surface of the shell 21 and the outer surface of the tab 231, that is, a second limiting groove is arranged on one side of the limit member 26 facing the electrode assembly 23 to accommodate the tab 231 of the electrode assembly 23, and the bottom wall of the second limiting groove is communicated with the bottom wall of the first limiting groove, so that the body part 241 can be welded with the tab 231. The limit member 26 has a positioning surface that matches the outer surface of the tab 231, that is, the shape of the groove sidewall of the second limiting groove is the same as the shape of the outer surface of the tab 231, and the outer surface of the tab 231 abuts against the groove sidewall of the second limiting groove.

The limit member 26 is equipped with a positioning surface that matches the outer circumference surface of the tab 231 to achieve positioning coordination between the limit member 26 and the tab 231, such that the limit member 26 can position the current collector component 24 on the tab 231 to reduce the phenomenon of radial movement of the current collector component 24 relative to the tab 231, which is conducive to reducing the risk of detachment between the current collector component 24 and the tab 231, and ensuring the use reliability of the battery cell 20.

According to some embodiments of the present application, as shown in FIGS. 3, 4, and 5, the battery cell 20 may also include a sealing member 27. The sealing member 27 is located on the side of the first limit part 212 away from the electrode assembly 23, and is configured to seal the end cover 22 and the shell 21.

The end cover 22 is located inside the shell 21, and at least part of the sealing member 27 is located between the outer surface of the end cover 22 and the inner surface of the shell 21. Therefore, the end cover 22 is radially sealed through the sealing member 27 to seal the gap between the end cover 22 and the shell 21.

For example, the material of the sealing member 27 can be polyimide, polyethylene, polyvinylidene fluoride or polytetrafluoroethylene.

Optionally, in FIG. 5, the shell 21 can also be equipped with a second limit part 213 at one end of the opening 211. The second limit part 213 is configured to limit the end cover 22 from detaching from the shell 21 in a direction away from the electrode assembly 23, and the sealing member 27 is located between the first limit part 212 and the second limit part 213.

As an example, the second limit part 213 can be a partially inward folded flange structure of the shell 21. By folding the shell 21, the second limit part 213 can be formed at the opening 211 of the shell 21. In the process of assembling the battery cell 20, the electrode assembly 23 and the current collector component 24 can be first accommodated in the shell 21, and then the shell 21 is processed to form a first limit part 212. Then, the end cover 22 and the sealing member 27 jointly abut against the first limit part 212, and finally, the second limit part 213 can be formed by folding the shell 21 to limit the end cover 22.

For example, the section of sealing member 27 is of a U-shaped structure, and the end cover 22 is inserted into the U-shaped groove of sealing member 27 along the radial direction of the current collector component 24, so that the part of sealing member 27 is located between the end cover 22 and the first limit part 212 and between the end cover 22 and the second limit part 213. This structure is conducive to improving the sealing effect between the end cover 22 and the shell 21.

The battery cell 20 is also equipped with a sealing member 27 for sealing the gap between the end cover 22 and the shell 21, and the sealing member 27 is arranged on the side of the first limit part 212 away from the electrode assembly 23, so as to achieve the connection position between the current collector component 24 and the shell 21 to be located on one side of the end cover 22, which is beneficial for reducing the interference caused by the connection position between the current collector component 24 and the shell 21 on the sealing between the end cover 22 and the shell 21, thereby ensuring the sealing effect between the end cover 22 and the shell 21.

According to some embodiments of the present application, as shown in FIGS. 4 and 5, a roller groove 214 is provided at a position of the outer surface of the shell 21 corresponding to the first limit part 212.

As an example, the roller groove 214 is a V-shaped groove to form the first limit part 212 of the V-shaped structure. In other embodiments, the roller groove 214 can also be a U-shaped groove or the like.

In an embodiment where the first limit part 212 is in an annular structure extending along the circumferential direction of the current collector component 24, the roller groove 214 can also be in an annular structure extending along the circumferential direction of the current collector component 24.

By setting a roller groove 214 on the outer surface of the shell 21, the shell 21 can form a first limit part 212 at the position corresponding to the roller groove 214 during the formation of the roller groove 214, which simplifies the forming process of the first limit part 212 and facilitates the manufacturing and processing for the first limit part 212.

According to some embodiments of the present application, the present application also provides a battery 100, including multiple battery cells 20 in any one of the above solutions.

According to some embodiments of the present application, the present application also provides an electrical device, including a battery 100 in any one of the above solutions, and the battery 100 is used to provide electrical energy to the electrical device.

The electrical device can be any of the aforementioned equipment or systems that use battery 100.

According to some embodiments of the present application, referring to FIGS. 3 to 7, the present application provides a battery cell 20, which includes a shell 21, an end cover 22, an electrode assembly 23, a current collector component 24, and a sealing member 27. The shell 21 has an opening 211, the inner surface of the shell 21 is provided with a first limit part 212 in a protruding manner and the first limit part 212 is in a circular structure extending along the circumference direction of the shell 21. The end cover 22 covers the opening 211, the electrode assembly 23 is accommodated within the shell 21, and the electrode assembly 23 and the end cover 22 are respectively located on the two sides of the first limit part 212, and the side of the electrode assembly 23 facing the end cover 22 has a tab 231. The first limit part 212 is configured to limit the movement of the end cover 22 in the direction facing the electrode assembly 23. The current collector component 24 includes a body part 241 and a connecting part 242 connected to the body part 241. The body part 241 is used to connect the tab 231, and the connecting part 242 is used to connect the first limit part 212. The body part 241 includes a first welding region 2411 and a second welding region 2412. The first welding region 2411 is located on the outer periphery of the second welding region 2412. The first welding region 2411 and the second welding region 2412 are separated by the connection position between the connecting part 242 and the body part 241. The first welding region 2411 and the second welding region 2412 are both welded to the tab 231, wherein along the radial direction of the current collector component 24, the distance from the connection position between the connecting part 242 and the body part 241 to the outer edge of the body part 241 is not less than 2 mm. The connecting part 242 includes an extension section 2421 and a connection section 2422. The extension section 2421 is connected to the body part 241, and the thickness of the extension section 2421 gradually decreases from one end connected to the body part 241 to one end connected to the connection section 2422. The extension section 2421 extends along an arc trajectory from one end connected to the body part 241 to one end connected to the connection section 2422, with the center of the arc trajectory located on the outer circumference of the extension section 2421. The connection section 2422 is connected to the extension section 2421, and the connection section 2422 is welded to one side of the first limit part 212 away from the electrode assembly 23, wherein the connection section 2422 is provided with multiple notches 2424 arranged at intervals along the circumferential direction of the current collector component 24, and the length of the connection section 2422 welded to the first limit part 212 is greater than or equal to half of the perimeter of the first limit part 212 in the circumferential direction of the current collector component 24.

The embodiments of the present application also provide a manufacturing method for battery cell 20, referring to FIG.

Figure 12:
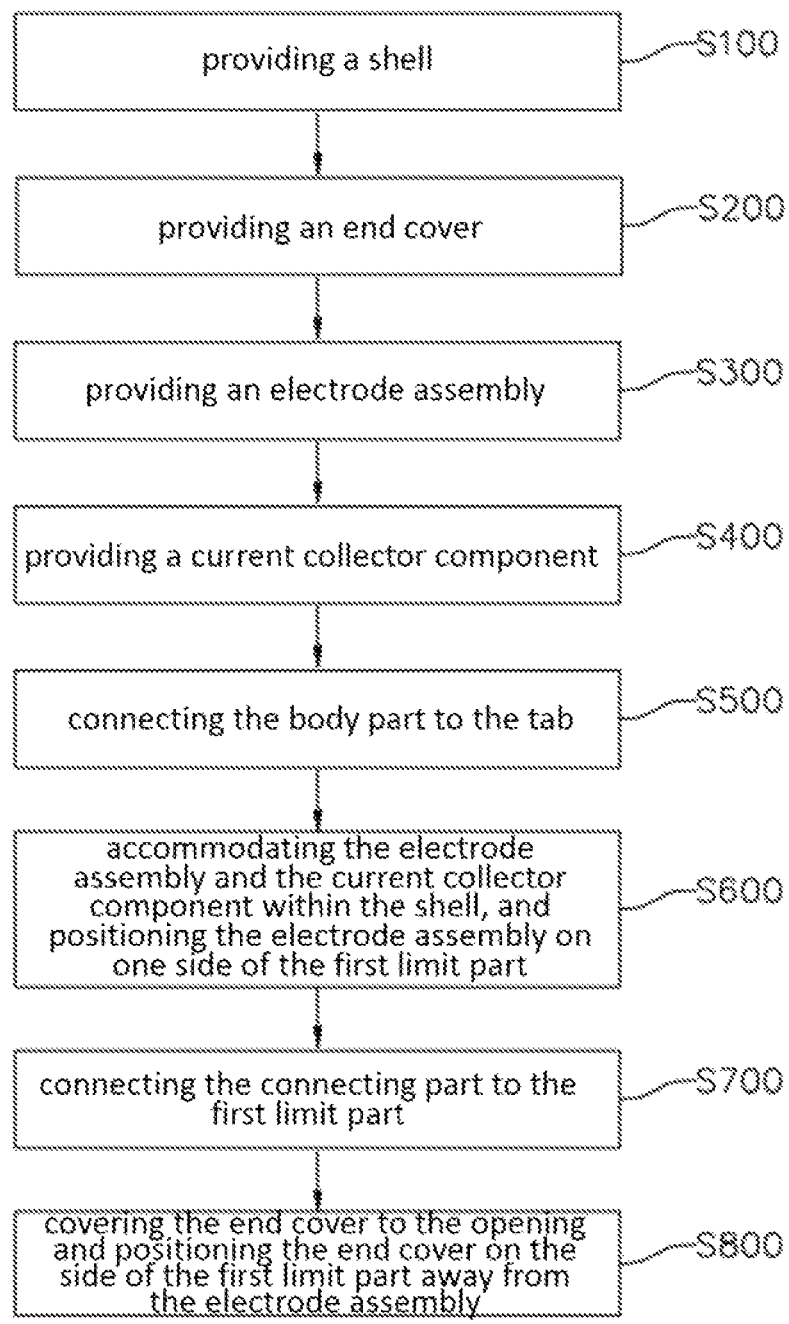
FIG. 12 is a flowchart schematic view of the manufacturing method for battery cell provided in some embodiments of the present application.

12, FIG. 12 is a schematic flowchart of the manufacturing method for battery cell 20 provided in some embodiments of the present application. The manufacturing method includes:

S100: providing a shell 21, wherein the shell 21 has an opening 211, and the inner surface of the shell 21 is provided with a first limit part 212 in a protruding manner;

S200: providing an end cover 22;

S300: providing an electrode assembly 23, wherein one side of the electrode assembly 23 has a tab 231;

S400: providing a current collector component 24, wherein the current collector component 24 includes a body part 241 and a connecting part 242 connected to the body part 241;

S500: connecting the body part 241 to the tab 231;

S600: accommodating the electrode assembly 23 and the current collector component 24 within the shell 21, and positioning the electrode assembly 23 on one side of the first limit part 212;

S700: connecting the connecting part 242 to the first limit part 212; and

S800: covering the end cover 22 to the opening 211 and positioning the end cover 22 on the side of the first limit part 212 away from the electrode assembly 23, wherein The body part 241 includes a first welding region 2411 and a second welding region 2412, wherein the first welding region 2411 is located on the outer periphery of the second welding region 2412, the first welding region 2411 and the second welding region 2412 are separated by the connection position between the connecting part 242 and the body part 241, and the first welding region 2411 and the second welding region 2412 are both welded to the tab 231.

It should be noted that the relevant structures of the battery cell 20 manufactured by the manufacturing methods provided in the above embodiments can be found in the battery cell 20 provided in the previous embodiments, and will not be further repeated here.

Figure 13:
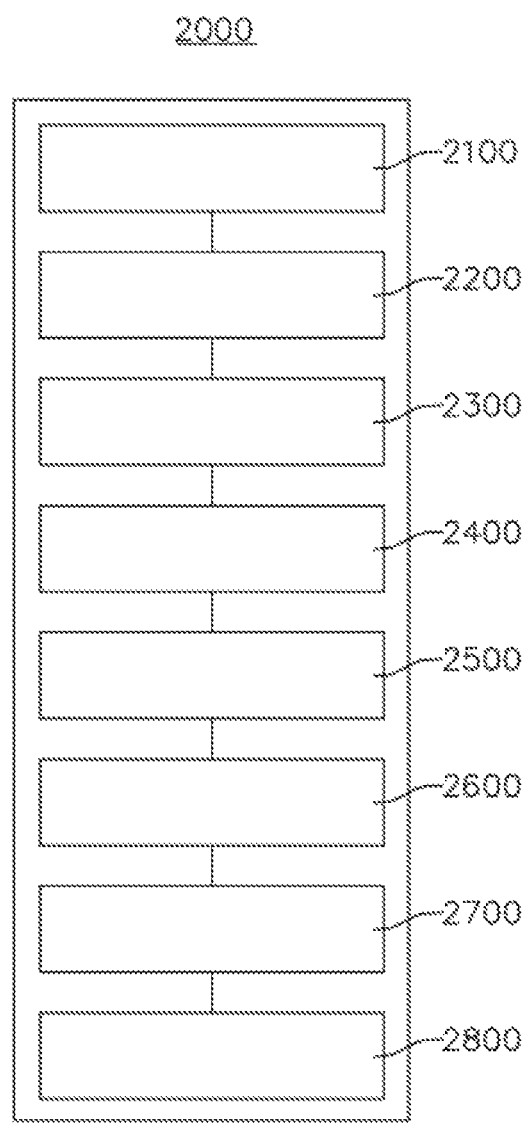
FIG. 13 is a schematic block diagram of the manufacturing equipment for battery cell provided in some embodiments of the present application.

The embodiment of the present application also provides a manufacturing equipment 2000 for battery cell 20, referring to FIG. 13, FIG. 13 is a schematic block diagram of the manufacturing equipment 2000 for battery cell 20 provided in some embodiments of the present application. The manufacturing equipment 2000 includes a first providing device 2100, a second providing device 2200, a third providing device 2300, a fourth providing device 2400, a first assembling device 2500, a second assembling device 2600, a third assembling device 2700, and a fourth assembling device 2800.

The first providing device 2100 is configured to provide a shell 21, wherein the shell 21 has an opening 211, and the inner surface of the shell 21 is provided with a first limit part 212 in a protruding manner. The second providing device 2200 is configured to provide the end cover 22. The third providing device 2300 is configured to provide an electrode assembly 23, wherein one side of the electrode assembly 23 has a tab 231. The fourth providing device 2400 is configured to provide a current collector component 24, wherein the current collector component 24 includes a body part 241 and a connecting part 242 connected to the body part 241. The first assembling device 2500 is configured to connect the body part 241 to the tab 231. The second assembling device 2600 is configured to accommodate the electrode assembly 23 and the current collector component 24 within the shell 21, and position the electrode assembly 23 on one side of the first limit part 212. The third assembling device 2700 is configured to connect the connecting part 242 to the first limit part 212. The fourth assembling device 2800 is configured to cover the end cover 22 to the opening 211 and position the end cover 22 on the side of the first limit part 212 away from the electrode assembly 23. The body part 241 includes a first welding region 2411 and a second welding region 2412, wherein the first welding region 2411 is located on the outer periphery of the second welding region 2412, the first welding region 2411 and the second welding region 2412 are separated by the connection position between the connecting part 242 and the body part 241, and the first welding region 2411 and the second welding region 2412 are both welded to the tab 231.

It should be noted that the relevant structures of the battery cell 20 manufactured by the manufacturing equipment 2000 provided in the above embodiments can be found in the battery cell 20 provided in the previous embodiments, and will not be further repeated here.

It should be noted that in the absence of conflicts, the embodiments and the features in the embodiments in the present application can be combined with each other.

The above is only preferred embodiments of the present application and is not intended to limit it. For those skilled in the art, the present application may undergo various modifications and variations. Any modifications, equivalent replacements, improvements, etc. made within the spirit and principles of the present application shall be included within the scope of protection of the present application.

What is claimed is:

1. A battery cell, comprising:
   a shell, wherein the shell has an opening, and an inner surface of the shell is provided with a first limit part in a protruding manner;
   an end cover, wherein the end cover covers the opening;
   an electrode assembly, wherein the electrode assembly is accommodated within the shell, and is located on a side of the first limit part away from the end cover, a side of the electrode assembly facing the end cover has a tab, and the first limit part is configured to limit a movement of the end cover in a direction facing the electrode assembly; and
   a current collector component, wherein the current collector component is accommodated within the shell, the current collector component comprises a body part and a connecting part connected to the body part, the body part is configured to connect the tab, and the connecting part is configured to connect the first limit part;
   wherein the body part comprises a first welding region and a second welding region, the first welding region is located on a periphery of the second welding region, the first welding region and the second welding region are separated by a connection position between the connecting part and the body part, and both the first welding region and the second welding region are welded to the tab.

2. The battery cell according to claim 1, wherein along a radial direction of the current collector component, a distance from the connection position between the connecting part and the body part to an outer edge of the body part is not less than 2 mm.

3. The battery cell according to claim 1, wherein the connecting part comprises:
   an extension section, wherein the extension section is connected to the body part, the extension section extends from the body part in a direction away from the electrode assembly, and the extension section is at least partially located on an inner periphery of the first limit part; and a connection section, wherein the connection section is connected to the extension section, and at least part of the connection section abuts against a side of the first limit part that is away from the electrode assembly and is connected to the first limit part.

4. The battery cell according to claim 3, wherein along an extension direction of the extension section, a thickness of the extension section gradually decreases from one end connected to the body part to one end connected to the connection section.

5. The battery cell according to claim 4, wherein the extension section extends along an arc trajectory from one end connected to the body part to one end connected to the connection section, with a center of the arc trajectory located on an outer circumference of the extension section.

6. The battery cell according to claim 3, wherein a connection position between the connection section and the extension section forms a notching groove for the connection section to bend relative to the extension section.

7. The battery cell according to claim 6, wherein an extension direction of the extension section is consistent with a thickness direction of the body part.

8. The battery cell according to claim 3, wherein the first limit part and the connecting part are both in a circular structure arranged along a circumferential direction of the current collector component.

9. The battery cell according to claim 8, wherein
the connection section is provided with multiple notches, wherein the multiple notches are arranged at intervals along the circumferential direction of the current collector component; and
along the circumferential direction of the current collector component, the connection section forms a bending region between each adjacent two notches, wherein the bending region can bend toward an outer circumference of the extension section relative to the extension section.

10. The battery cell according to claim 8, wherein the connection section is welded with the first limit part to form a weld mark, and a length of the weld mark is not less than half of a perimeter of the first limit part along the circumferential direction of the current collector component.

11. The battery cell according to claim 3, wherein an abutting plane for the connection section to abut is formed at a side of the first limit part away from the electrode assembly.

12. The battery cell according to claim 1, wherein the battery cell further comprises:
a limit member, wherein the limit member is accommodated within the shell, and the limit member is at least partially located between an inner surface of the shell and an outer surface of the body part, so as to limit a movement of the body part along a radial direction of the current collector component.

13. The battery cell according to claim 12, wherein the limit member is in an interference fit with the body part.

14. The battery cell according to claim 12, wherein the limit member is at least partially located between the inner surface of the shell and an outer surface of the tab, and the limit member has a positioning surface that fits with the outer surface of the tab.

15. The battery cell according to claim 1, wherein the battery cell further comprises:
a sealing member, wherein the sealing member is located on a side of the first limit part away from the electrode assembly, and the sealing member is configured to seal the end cover and the shell.

16. The battery cell according to claim 1, wherein a roller groove is provided at a position of an outer surface of the shell corresponding to the first limit part.

17. A battery, comprising multiple battery cells, wherein the multiple battery cells are each the battery cell according to claim 1.

18. An electrical device, comprising the battery according to claim 17.

19. A method for manufacturing a battery cell, comprising:
providing a shell, wherein the shell has an opening, and an inner surface of the shell is provided with a first limit part in a protruding manner;
providing an end cover;
providing an electrode assembly, wherein one side of the electrode assembly has a tab;
providing a current collector component, wherein the current collector component comprises a body part and a connecting part connected to the body part;
connecting the body part to the tab;
accommodating the electrode assembly and the current collector component within the shell, and positioning the electrode assembly on one side of the first limit part;
connecting the connecting part to the first limit part; and
covering the end cover to the opening and positioning the end cover on a side of the first limit part away from the electrode assembly,
wherein the body part comprises a first welding region and a second welding region, the first welding region is located on a periphery of the second welding region, the first welding region and the second welding region are separated by a connection position between the connecting part and the body part, and both the first welding region and the second welding region are welded to the tab.

20. Equipment for manufacturing a battery cell, comprising:
a first providing device, wherein the first providing device is configured to provide a shell, wherein the shell has an opening, and an inner surface of the shell is provided with a first limit part in a protruding manner;
a second providing device, wherein the second providing device is configured to provide an end cover;
a third providing device, wherein the third providing device is configured to provide an electrode assembly, wherein one side of the electrode assembly has a tab;
a fourth providing device, wherein the fourth providing device is configured to provide a current collector component, wherein the current collector component comprises a body part and a connecting part connected to the body part;
a first assembling device, wherein the first assembling device is configured to connect the body part to the tab;
a second assembling device, wherein the second assembling device is configured to accommodate the electrode assembly and the current collector component within the shell, and position the electrode assembly on one side of the first limit part;
a third assembling device, wherein the third assembling device is configured to connect the connecting part to the first limit part; and
a fourth assembling device, wherein the fourth assembling device is configured to cover the end cover to the opening and position the end cover on a side of the first limit part away from the electrode assembly,
wherein the body part comprises a first welding region and a second welding region, the first welding region is located on a periphery of the second welding region, the first welding region and the second welding region are separated by a connection position between the connecting part and the body part, and both the first welding region and the second welding region are welded to the tab.

\* \* \* \* \*